United States Patent
Han et al.

(10) Patent No.: US 6,310,405 B1
(45) Date of Patent: Oct. 30, 2001

(54) NON-DIRECTIONAL FREQUENCY GENERATOR SPARK PREVENTION APPARATUS

(75) Inventors: Yong-woon Han, Kunpo; Seong-deog Jang; Kwang-seok Kang, both of Suwon; Han-jun Sung, Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/501,604

(22) Filed: Feb. 10, 2000

(30) Foreign Application Priority Data

Sep. 21, 1999 (KR) .................................................. 99-40529

(51) Int. Cl.[7] .............................. H02P 11/06; H02K 11/00
(52) U.S. Cl. ............................... 290/7; 322/95; 318/439; 310/68 R
(58) Field of Search .................................... 290/1 R, 1 A, 290/5, 6, 7; 322/95; 318/439; 310/68 R

(56) References Cited

U.S. PATENT DOCUMENTS

| | | | | |
|---|---|---|---|---|
| 3,631,273 | * | 12/1971 | Stein | 310/46 |
| 4,305,027 | * | 12/1981 | Wilson | 318/439 |
| 5,473,227 | * | 12/1995 | Arnaud et al. | 318/139 |
| 5,633,792 | * | 5/1997 | Massey | 363/109 |
| 5,905,319 | * | 5/1999 | McLendon | 310/68 R |
| 6,047,104 | * | 4/2000 | Cheng | 388/835 |
| 6,075,305 | * | 6/2000 | Daikoku et al. | 310/233 |

FOREIGN PATENT DOCUMENTS 0 957 569 A2  11/1999 (EP) .
658749        10/1951 (GB) .
735261         8/1955 (GB) .

* cited by examiner

*Primary Examiner*—Nicholas Ponomarenko
(74) *Attorney, Agent, or Firm*—Robert E. Bushnell, Esq.

(57) ABSTRACT

A non-directional frequency generator spark prevention apparatus including a plurality of electric connections connected with a direct current power source, i.e., brushes, and a commutator for converting direct current waveform inputted through the brushes into alternating current waveform by rotational movement thereof, and for outputting the alternating current waveform. A voltage pulse controlling part is connected between the brushes of the non-directional frequency generator, while having a resistor and a transistor which are connected in series with each other, and the transistor is operated synchronously with the rotation of the commutator of the non-directional frequency generator. By controlling the electric current to flow through the transistor during the brush-off period, a spark production during the brush-off period can be prevented. Further, by controlling the transistor to be turned off during a predetermined period between a predetermined time of the brush-off period to a predetermined time of the brush-on period, the electric current does not flow through the transistor at the beginning of the brush-on period, and accordingly, the spark production at the beginning of the brush-on period is prevented. A corresponding pulse generating part includes a photointerrupter and a photo sensor, for generating a predetermined pulse waveform corresponding to the rotation of the commutator. Based on the pulse waveform, the transistor is operated, and accordingly, the transistor precisely synchronizes with the rotation of the commutator of the non-directional frequency generator.

8 Claims, 4 Drawing Sheets

NON-DIRECTIONAL FREQUENCY GENERATOR SPARK PREVENTION APPARATUS

This application makes reference to, incorporates the same herein, and claims all benefits accruing under 35 U.S.C. §119 from an application for NDFG SPARK PREVENTION APPARATUS FOR AN AC/DC MICROWAVE OVEN earlier filed in the Korean Industrial Property Office on Sep. 21, 1999 and there duly assigned Ser. No. 40529/1999.

BACKGROUND OF THE INVENTION

1. Field of the Invention

The present invention relates to a non-directional frequency generator, and more particularly to a non-directional spark prevention apparatus for preventing sparks generated from a non-directional frequency generator.

2. Description of the Related Art

Generally, electronic appliances such as microwave ovens, etc., are designed to be driven solely by an alternating current (hereinafter called AC) power source, and accordingly have a shortcoming in that the electronic appliances can not be used in the places such as the outdoors, in vehicles such as ships, airplanes, etc., where the AC power source is not available. In order to solve such a problem, a non-directional frequency generator (hereinafter called NDFG) has been used to convert direct current (hereinafter called DC) into AC in the places where the AC power source is not available.

The NDFG usually uses relays or semiconductor elements for its converting operation into AC. The conventional semiconductor type NDFG circuit, however, has some problems of increasing manufacturing cost due to the expensive semiconductor elements, output loss of the semiconductor elements due to the switching operation, and excessive heat generation due to the output loss, etc.

In order to solve the above problems, the same applicant disclosed a NDFG utilizing a rotational AC converter to convert DC into AC in the Korean Patent Application Nos. 98-18589 (filed May 22, 1998) and 98-21117 (filed Jun. 8, 1998), which have not been opened to the public yet.

Hereinafter, the above NDFG will be briefly described as a related art with reference to the accompanying drawings.

FIG. 1 is a schematic view for showing the NDFG of a microwave oven driven by the DC power source according to the related art of the present invention. FIG. 2 is a view for showing the waveforms of the AC power source generated by the rotation of the NDFG, in which (a), (b), and (c) refer to the output waveforms of a first relay $RY_1$, a second relay $RY_2$, and a non-directional frequency generator.

Referring to FIG. 1, the NDFG 100 includes a motor 110 driven by the DC power source for generating rotational force, a commutator 130 rotated by the motor 110, and a plurality of brushes such as first, second, third, and fourth brushes 121–124 as shown in FIG. 1, which are in contact with the outer circumference of the commutator 130. The commutator 130 includes a conductive part which is divided into at least two parts 132a and 132b as shown in FIG. 1, but into an even number of parts. The commutator 130 includes an insulating part 133 of a predetermined width formed between the conductive parts 132a and 132b. The conductive parts 132a and 132b are in simultaneous contact with at least two neighboring brushes 121–124. The DC is applied to input sides of the first to fourth brushes 121–124, while the output sides of the first to fourth brushes 121–124 are connected with a high voltage transformer (hereinafter called HVT). The first and second relays $RY_1$ and $RY_2$ switch on/off the operation of the NDFG 100.

The operation of the NDFG 100 is as follows: The first and second relays $RY_1$ and $RY_2$ are in the on-state, and the commutator 130 is rotated by the DC. Accordingly, the brushes 121–124 in contact with the commutator 130 come in contact with the conductive part 132a, the insulating part 133, the conductive part 132b, and the insulating part 133 which are formed on the outer circumference of the commutator 130, sequentially.

More specifically, as the first brush 121 on the upper side of the commutator 130 comes in contact with the conductive part 132a, the electric current from the positive (+) terminal of the DC power source is inputted into the first brush 121, and flows through the conductive part 132a of the commutator 130 and the fourth brush 124, and to the upper portion of the primary coil 202 of the HVT downwardly to the lower portion of the primary coil 202 of the HVT. Then, the electric current is inputted into the second brush 122, and circulates through the conductive part 132b, the third brush 123, and to the negative (–) terminal of the DC power source.

Next, as the commutator 130 is further rotated and as the first brush 121 accordingly comes in contact with the insulating part 133, the electric current can not flow through the commutator 130.

Then the commutator 130 is further rotated to 90°, the electric current from the positive (+) terminal of the DC power source is inputted into the first brush 121, flows through the conductive part 132b of the commutator 130 and the second brush 122, reverses its direction, and flows from the lower portion of the primary coil 202 of the HVT to the upper portion of the primary coil 202 of the HVT. Then, the electric current is inputted into the fourth brush 124, flows through the conductive part 132a, and the third brush 123, and then circulates to the negative (–) terminal of the DC power source.

By the constant rotation of the commutator 130 of the NDFG, AC is generated at the primary coil 202 of the HVT in a manner as described above, then the AC is transmitted to a secondary coil of the HVT through the primary coil 202 thereof. Then, the HVT converts the normal voltage into a high voltage, and the magnetron MGT is driven by the high voltage stepped-up by the HVT.

While the AC power is generated as above, there are two periods that alternate with each other, i.e., a brush-on period in which the conductive part 132a or 132b of the commutator 130 comes in contact with the brushes 121–124 so that the electric current flows through the commutator 130, and a brush-off period in which the insulating part 133 of the commutator 130 comes in contact with any of the brushes 121–124 so that the electric current can not flow through the commutator 130. Meanwhile, during the brush-off period, the energy stored in the secondary coil of the HVT and a capacitor during the brush-on period is induced to the primary coil of the HVT. Accordingly, the voltage is induced during the brush-off period, generating backward current. Referring to FIGS. 2A through 2C, voltage waveforms VW and current waveforms CW induced from the secondary coil to the primary coil of the HVT during the brush-off period are shown. In FIGS. 2A and 2B illustrate direct current waveforms inputted while the first and second relays of the NDFG 100 are switched on, while FIG. 2C illustrates alternating current waveforms detected at the output side of the NDFG 100.

In addition to the voltage and current waveforms shown in FIGS. 2A through 2C, spark waveforms are also shown which are steeply falling at the beginning of the brush-off period. The spark waveforms suddenly fall when the brush-on period is changed over to the brush-off period during the operation of the circuit, which means the excessive spark is produced between the commutator 130 and the brushes 121–124 at the beginning of the brush-off period, i.e., when the brush-on period is changed over to the brush-off period.

Such a generation of sparks destabilizes the operation of the NDFG, and shortens the life time of the NDFG.

SUMMARY OF THE INVENTION

The present invention has been developed to overcome the above problems of the related art, and accordingly it is an object of the present invention to provide a non-directional frequency generator spark prevention apparatus for preventing a spark production at the beginnings of brush-on/off periods of the non-directional frequency generator which is for converting direct current into alternating current.

The above object is accomplished by a non-directional frequency generator spark prevention apparatus according to the present invention, including: a non-directional frequency generator having a plurality of electric connections connected with a direct current power source, and a commutator for converting direct waveforms inputted through the electric connections into alternating waveforms, and for outputting alternating current waveforms; and a voltage pulse controlling part connected between the respective electric connections of the non-directional frequency generator, for controlling alternating current waveforms outputted from the non-directional frequency generator by being controlled to have the conducting status synchronizing with the rotation of the commutator of the non-directional frequency generator.

The voltage pulse controlling part includes a resistor and a transistor which are connected in series with each other, and the transistor of the voltage pulse controlling part is controlled by the microcomputer in a manner that the operation time thereof is controlled, to generate the voltage pulse for controlling alternating current waveform outputted from the non-directional frequency generator.

The transistor of the voltage pulse controlling part is controlled to be in a conducting status during a brush-off period so as to prevent a spark production during the brush-off period.

The transistor of the voltage pulse controlling part is controlled to be in the non-conducting status during a predetermined period from a predetermined time of a brush-on period to a predetermined time of the brush-off period during which the electric current does not flow through the transistor to prevent a spark production at a beginning of the brush-on period.

The non-directional frequency generator spark prevention apparatus further includes a corresponding pulse generating part for generating a predetermined pulse waveform corresponding to the rotation of the commutator of the non-directional frequency generator by being synchronously rotated with the commutator to permit the voltage pulse controlling part to synchronously enter into the conducting status corresponding to the rotation of the commutator.

The corresponding pulse generating part includes: a photo-interrupter having a plurality of wings, which is fixed on a motor shaft of a motor of the non-directional frequency generator to be synchronously rotated with the commutator, for generating a pulse waveform corresponding to the rotation of the commutator; and a photo sensor having a light emitting part and a light receiving part in which light from the light emitting part is cut-off or passed by the rotating photo-interrupter so that the light receiving part selectively receives optical pulse, the photo sensor for generating the pulse waveforms corresponding to the optical pulse.

The electric connections of the non-directional frequency generator include 2n (n=natural number) of input and output terminals for generating alternating current waveforms of (n) period, and the photo-interrupter of the corresponding pulse generating part comprises (n) of wings for generating pulse waveforms of (n) period which synchronize with the alternating current waveforms during one rotation of the commutator.

As described above, in the non-directional frequency generator spark prevention apparatus according to the present invention, the corresponding pulse generating part having a photo-interrupter and a photo sensor generates a predetermined pulse waveform corresponding to the rotation of the commutator of the non-directional frequency generator, while the voltage pulse controlling part having electric connections and the commutator generates a predetermined voltage pulse corresponding to the pulse waveform generated from the corresponding pulse generating part. By the voltage pulse generated from the voltage pulse controlling part, the conducting status of the transistor, and more particularly the conducting time of the transistor is controlled, controlling the alternating current waveform outputted from the non-directional frequency generator.

Accordingly, when electronic appliances such as a microwave oven are driven by the DC power source, the alternating current waveform is properly controlled by controlling the conducting status, particularly by controlling the conducting time of the transistor, the spark production at the beginning of the brush-off period at the electronic connections of the non-directional frequency generator, i.e., at the brushes, can be prevented. Accordingly, the lifetime of the non-directional frequency generator is lengthened, while the stable operation thereof is guaranteed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
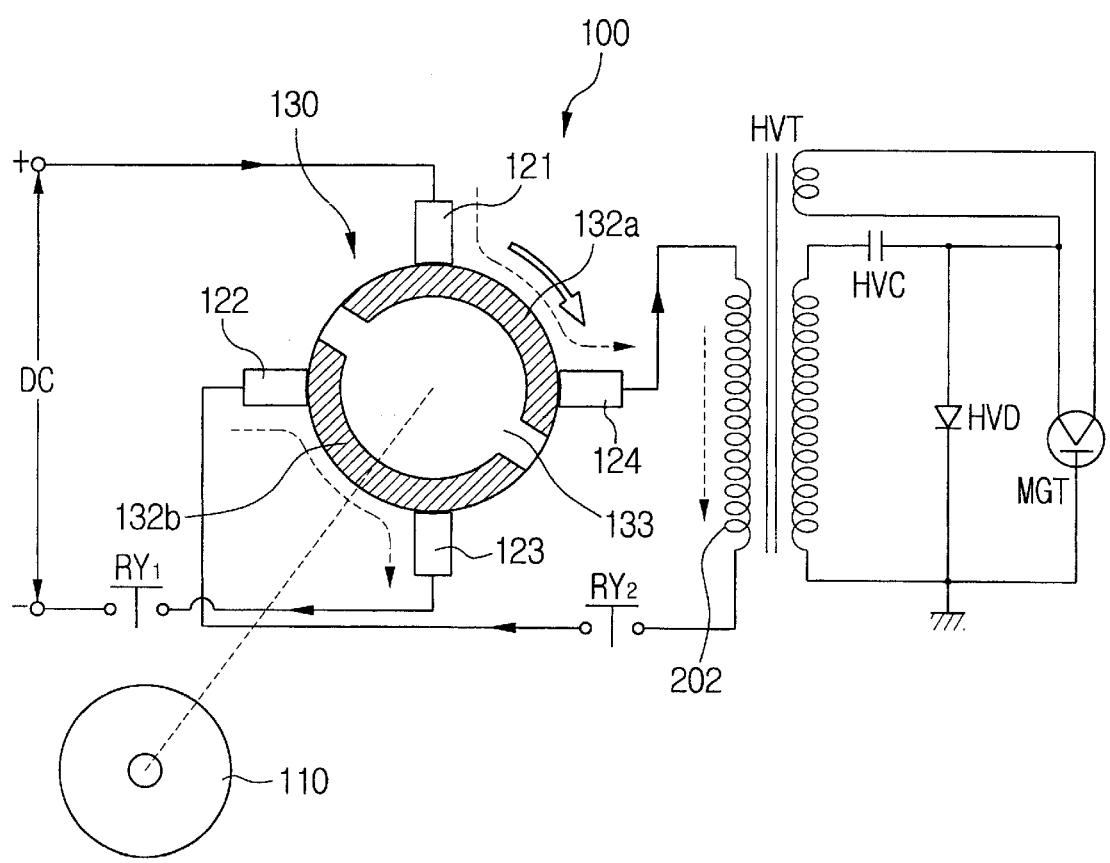
FIG. 1 is a circuit diagram for showing a non-directional frequency generator and a magnetron driving part connected thereto according to a related art of the present invention.

Hereinafter, the preferred embodiment of the present invention will be described in greater detail with reference to the accompanied drawings, while the like elements are referred to by the same reference numerals throughout.

Figure 3:
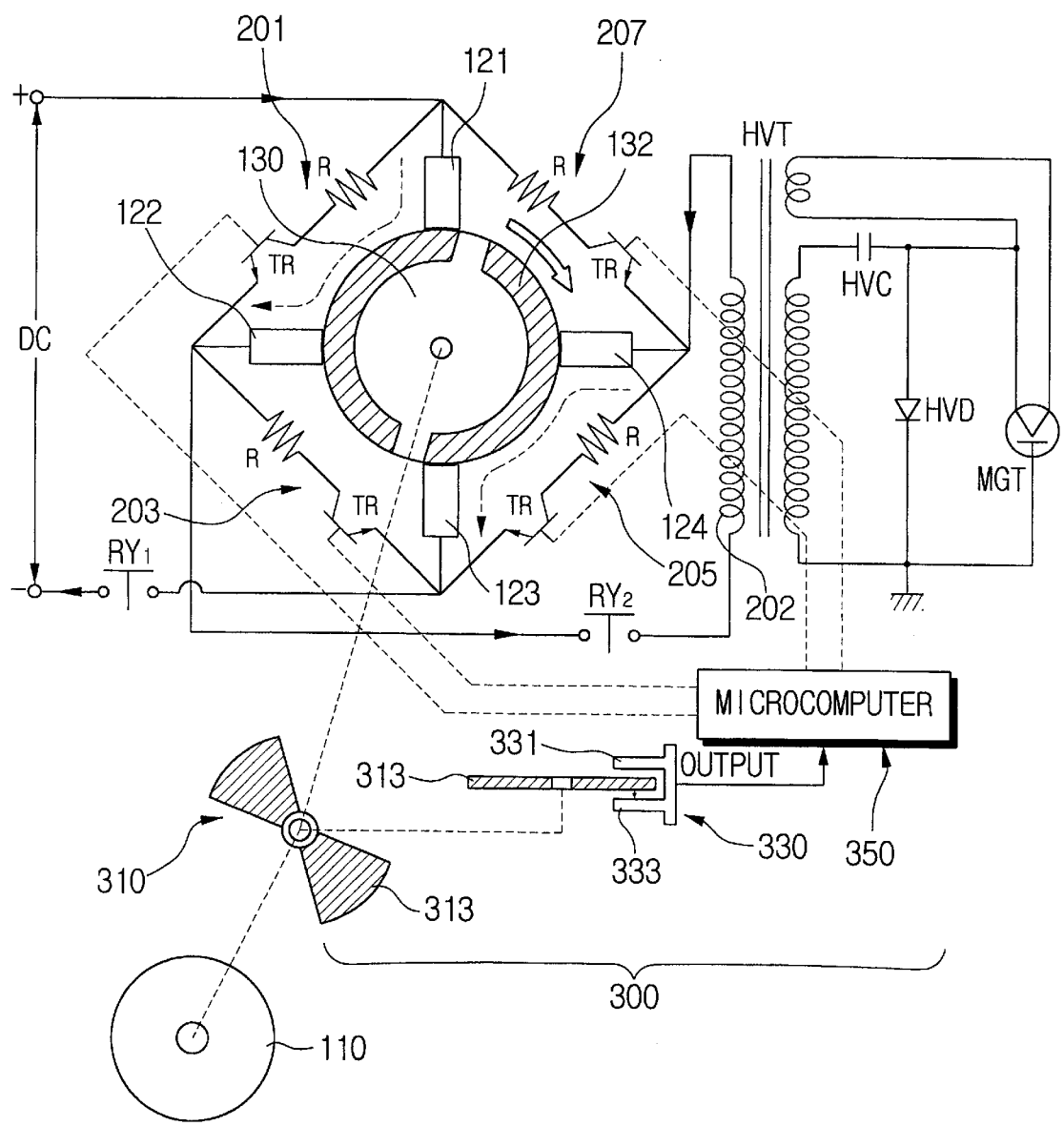
FIG. 3 is a circuit diagram for showing a non-directional frequency generator spark prevention apparatus according to a preferred embodiment of the present invention.

FIG. 3 is a circuit diagram for showing the non-directional frequency generator spark prevention apparatus according to a preferred embodiment of the present invention.

Referring to FIG. 3, the non-directional frequency generator 200 NDFG includes a motor 110 driven by a direct current DC power source to generate the rotational force.

A commutator 130 includes a cylindrical body 131 rotated by the motor 110, and a conductive part which is divided into at least two parts 132a and 132b such as shown in FIG. 3, but into an even number of parts, and an insulating part 133 of a predetermined width formed therebetween.

The outer circumference of the commutator 130 is in contact with a plurality of electrical connections, i.e., a plurality of brushes such as first, second, third, and fourth brushes 121–124 as shown in FIG. 3. The two neighboring brushes of the four brushes 121–124 are in simultaneous contact with any one of the conductive parts 132a and 132b of the commutator 130.

The DC is applied to the input sides of the four brushes 121–124, while the output sides of the brushes 121–124 are connected with a high voltage transformer HVT. First and second relays $RY_1$ and $RY_2$ turn on/off the operation of the NDFG 200.

Thus, the DC waveforms are inputted into the commutator 130 through the brushes 121–124 from the DC power source, and are converted into alternating current AC power by the rotational movement of the commutator 130 to be outputted.

In order to control the AC waveforms outputted from the NDFG 200, voltage pulse controlling parts 201, 203, 205, and 207 are connected between the respective electric connections of the NDFG 200. The voltage pulse controlling part 201 is connected between the first and second brushes 121 and 122, the voltage pulse controlling part 203 is connected between the third and fourth brushes 123 and 124, the voltage pulse controlling part 205 is connected between the second and third brushes 122 and 123, and the voltage pulse controlling part 205 is connected between the fourth and first brushes 124 and 121, respectively. The voltage pulse controlling parts 201, 203, 205, and 207 include resistors R and transistors TR which are connected in series with each other between the two neighboring brushes, respectively.

In order to tune the operation of the transistors TR of the voltage pulse controlling parts 201, 203, 205, and 207 with the AC waveforms outputted by the rotation of the commutator 130, a corresponding pulse generating part 300 is additionally employed to generate a predetermined pulse waveform corresponding to the rotation of the commutator 130 by being synchronously rotated together with the commutator 130 of the NDFG 200.

The corresponding pulse generating part 300 includes a photo-interrupter 310, a photo sensor 330, and a microcomputer 350.

In order to output the pulse waveforms synchronized with the rotation of the commutator 130, the photo-interrupter 310 includes a plurality of wings 313 such as the two wings 313 as shown in FIG. 3, and is fixed on the motor shaft of the NDFG 200 to be synchronously rotated together with the commutator 130.

The photo sensor 330 includes a light emitting part 331 and a light receiving part 333, which are received in the photo-interrupter 310. Accordingly, during the rotation of the photo-interrupter 310, the light emitted from the light emitting part 331 of the photo sensor 330 is selectively cut-off or passed by the photo-interrupter 310 so that the light receiving part 333 selectively receives an optical pulse from the light emitting part 331, and accordingly generates pulse waveforms corresponding to the optical pulse.

The microcomputer 350 controls the operation time of the transistors TR of the voltage pulse controlling parts 201, 203, 205, and 207 based on the outputted signals from the photo sensor 330. The microcomputer 350 controls the transistors TR of the voltage pulse controlling parts 201, 203, 205, and 207, and the first and second relays $RY_1$ and $RY_2$.

Hereinafter, the operation of the NDFG spark prevention apparatus according to the preferred embodiment of the present invention will be described in greater detail.

Figure 4A:
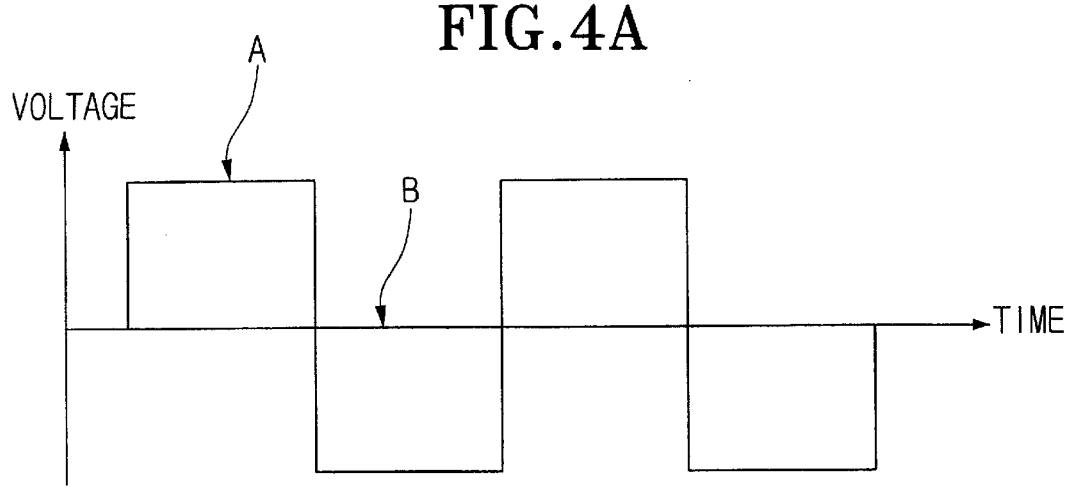
FIG. 4A is a view for showing waveforms outputted from a photo sensor during the operation of a photo-interrupter of the corresponding pulse generating part of FIG. 3.
Figure 4B:
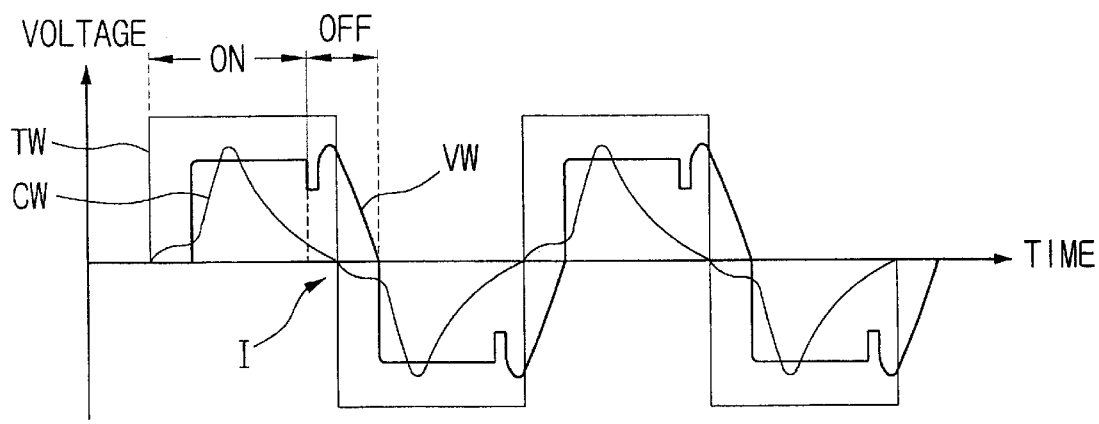
FIG. 4B is a view for showing waveforms outputted from the non-directional frequency generator during the operation of a transistor of the voltage pulse controlling part of FIG. 3.
Figure 4C:
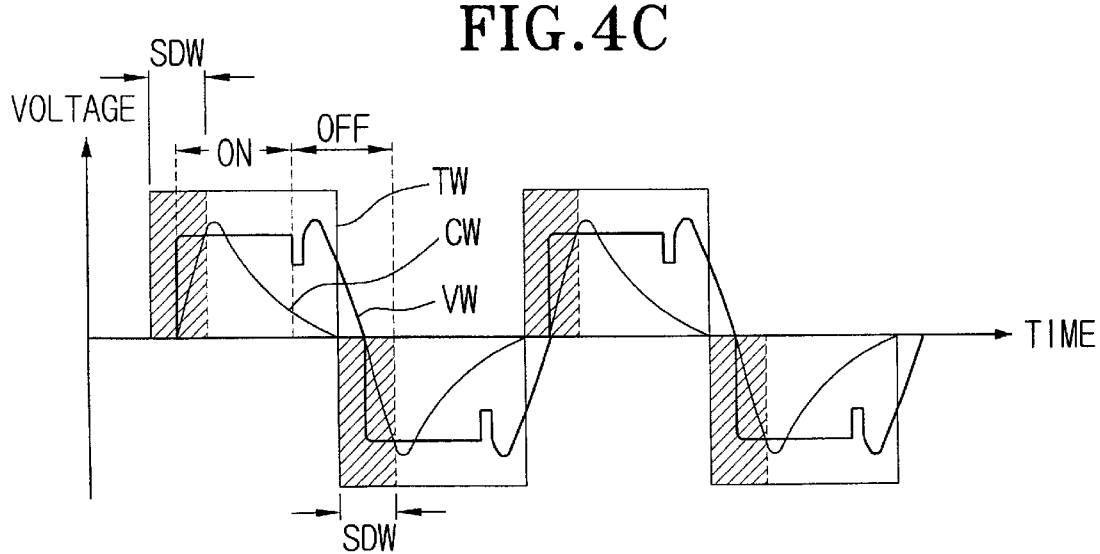
FIG. 4C is a view for showing waveforms outputted from the non-directional frequency generator when the operation time of the transistor of the voltage pulse controlling part of FIG. 3 is controlled by a microcomputer.

FIG. 4A is a view for showing waveforms outputted from a photo sensor 330 during the operation of a photo-interrupter 310 of the corresponding pulse generating part 300 of FIG. 3, FIG. 4B is a view for showing waveforms outputted from the NDFG 200 during the operation of transistors TR of the voltage pulse controlling parts 201, 203, 205, and 207 of FIG. 3, and FIG. 4C is a view for showing the waveforms outputted from the NDFG 200 when the operation time of the transistors TR of the voltage pulse controlling parts 201, 203, 205, and 207 of FIG. 3 are controlled by the microcomputer 350.

The operation of the NDFG 200 is as follows: As shown in FIG. 3, the first and second relays $RY_1$ and $RY_2$ are turned on, and the motor 110 is rotated by DC power. Accordingly, the commutator 130 and the photo-interrupter 310 connected with the motor 110 are synchronously rotated altogether.

Here, the photo-interrupter 310 includes two wings 313, and is fixed on the motor shaft of the motor 110, to be rotated by being synchronized with the commutator 130. The photo-interrupter 310 is disposed between the light emitting part 331 and the light receiving part 333 of the photo sensor 330, and accordingly, as the photo-interrupter 310 is rotated, the light emitted from the light emitting part 331 is selectively cut-off by the wings 313 of the photo-interrupter 310, or passed therethrough. Accordingly, the light receiving part 333 selectively receives the optical pulse. During one rotation of the photo interrupter 310, i.e., during one rotation of the commutator 130, the wings 313 of the photo-interrupter 310 block or pass the light twice, respectively. FIG. 4A shows the waveforms outputted from the photo sensor 330 during one rotation of the photo-interrupter 310, in which the reference character A indicates the waveforms when the light from the light emitting part 331 is passed to the light receiving part 333, while B indicates the waveforms when the light from the light emitting part 331 is cut off by the wings 313 of the photo-interrupter 310.

Meanwhile, as the commutator 130 is rotated, the brushes 121–124 in contact with the outer circumference of the commutator 130 come in contact with the conductive part 132a, the insulating part 133, the conductive part 132b, and the insulating part 133 which are formed on the outer circumference of the commutator 130, sequentially.

More specifically, first, as the commutator 130 is rotated clockwise, the first brush 121 comes in contact with the conductive part 132a of the commutator 130, the electric current from the positive (+) terminal of the DC power source is inputted into the first brush 121, and flows through the conductive part 132a of the commutator 130, and the fourth brush 124, to the upper portion of the primary coil 202 of the HVT to the lower portion of the primary coil 202 of the HVT. Then, the electric current is inputted into the second brush 122, and circulates to the negative (−) terminal of the DC power source via the conductive part 132b of the commutator 130, and the third brush 123 at the lower portion of the commutator 130.

Next, as the commutator 130 is further rotated clockwise, the first brush 121 comes in contact with the insulating part 133, and the electric current does not flow through the commutator 130.

Then, as the commutator 130 is further rotated clockwise to 90°, the electric current from the positive (+) terminal of the DC power source is inputted into the first brush 121, and flows through the conductive part 132b of the commutator 130, and the second brush 122 at the left-hand side of the commutator 130, and then reverses its direction to the lower portion of the primary coil 202 of the HVT to the upper portion of the primary coil 202 of the HVT. Then, the electric current is inputted into the fourth brush 124, and circulates to the negative (−) terminal of the DC power source via the conductive part 132a of the commutator 130, and the third brush 123.

In the above-described manner, the commutator 130 of the NDFG 200 is rotated, and the AC power is generated at the primary coil 202 of the HVT.

Figure 2A:
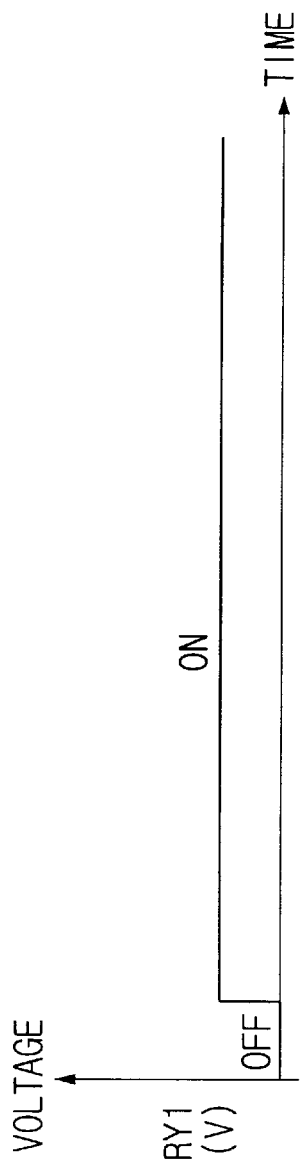
FIGS. 2A through 2C together illustrate a view for showing alternating current generated by the rotation of the non-directional frequency generator.
Figure 2B:
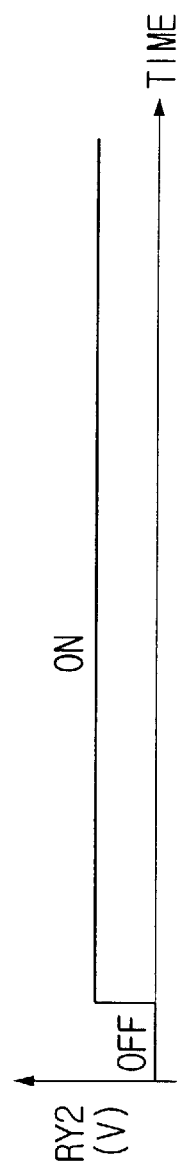
Figure 2C:
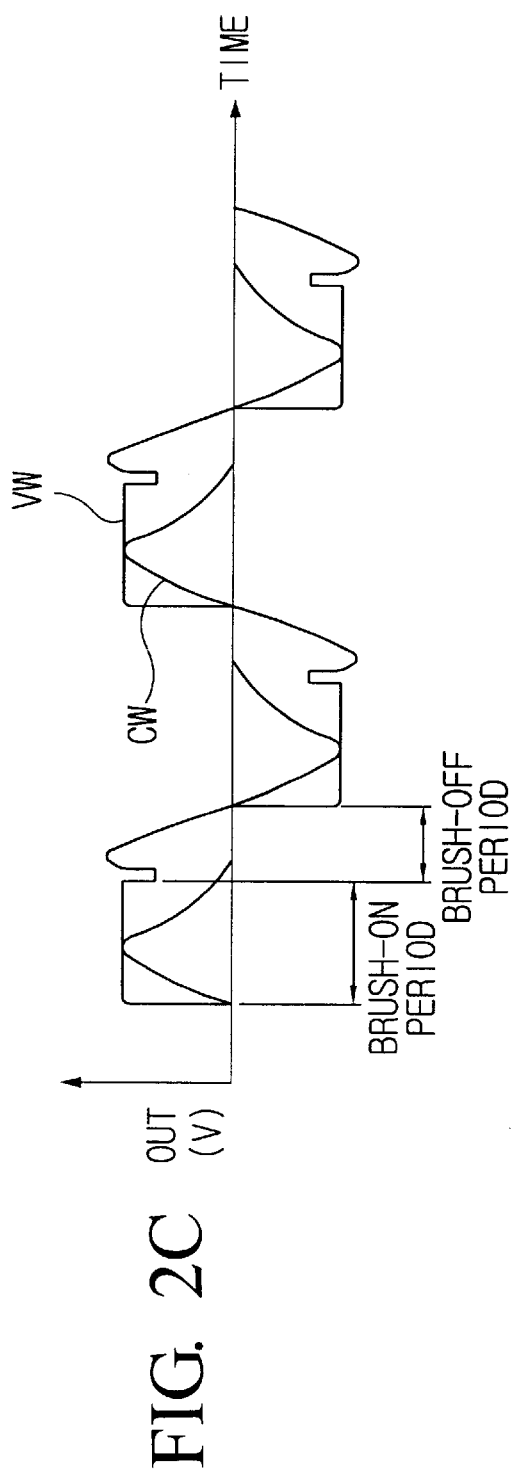

When the microcomputer 350 is not operated, the transistors TR are in the non-conducting status, and accordingly, the AC waveforms outputted by the rotation of the commutator 130 are identical with the same shown in FIG. 2.

Here, as shown in the spark waveforms of the voltage waveforms in FIG. 2, the spark is produced at the beginning of the brush-off period. In order to prevent such a spark, the transistors TR of the voltage pulse controlling parts 201, 203, 205, and 207 are operated. As shown in FIG. 4A, the transistors TR are on/off controlled by the microcomputer 350. The microcomputer 350 controls the operation of he transistors TR based on the pulse signals from the photo sensor 330. That is, the microcomputer 350 operates the transistors TR of the voltage pulse controlling parts 201 and 205 when the pulse signals from the photo sensor 330 indicate the waveforms A (See FIG. 4A), while the microcomputer 350 operates the transistors TR of the voltage pulse controlling parts 203 and 207 when the pulse signals from the photo sensor 330 indicate the waveforms B (See FIG. 4A). Here, the pulse signals from the photo sensor 330 are the signals which are required to synchronize the operation of the transistors TR of the voltage pulse controlling parts 201,203,205, and 207 with the AC waveforms outputted by the rotation of the commutator 130.

FIG. 4B shows the respective outputted waveforms of the NDFG 200 according to the present invention. In FIG. 4B, the reference character VW indicates the outputted voltage waveforms of the NDFG 200 when the voltage pulse controlling parts 201, 203, 205, and 207 are not operated, and TW indicates the outputted voltage waveforms of the NDFG 200 when the transistors TR of the voltage pulse controlling parts 201, 203, 205, and 207 are operated. The reference character CW indicates the outputted current waveforms of the NDFG 200 when the transistors TR are operated.

As shown in the characters VW and TW of FIG. 4B, the voltage pulse controlling parts 201 and 205 and the other voltage pulse controlling parts 203 and 207 are alternately operated in accordance with the direction of the AC power of the NDFG 200 under the control of the microcomputer 350. That is, the microcomputer 350 operates the transistors TR of the voltage pulse controlling parts 201 and 205 when the electric current flows in the forward direction (that is, when the electric current flows from the first brush 121 to the second brush, and from the fourth brush 124 to the third brush 123), while the microcomputer 350 operates the transistors TR of the voltage pulse controlling parts 203 and 207 when the electric current flows in the reverse direction (that is, when the electric current flows from the first brush 121 to the second brush 122, and from the fourth brush 124 to the third brush 123). Further, the switching from the voltage pulse controlling parts 201 and 205 to the other voltage pulse controlling parts 203 and 207 is carried out at a predetermined time (I) of the brush-off period.

Accordingly, during the operation of the transistors TR of the voltage pulse controlling parts 201, 203, 205, and 207, the electric current flows through the transistors TR during the brush-off period, so that a spark is not produced during the brush-off period.

As described above, the spark production during the brush-off period is prevented by flowing the electric current through the transistors TR. However, there still is a spark produced at the beginning of the brush-on period due to the electric current which flows through the transistors TR when the brush-off period is changed over to the brush-on period.

In order to solve the above problem, as shown in FIG. 4C, the microcomputer 350 turns off the transistors TR during a predetermined period SDW between a predetermined time of the brush-off period and to a predetermined time of the brush-on period. Accordingly, the electric current does not flow through the transistors TR at the beginning of the brush-on period, and the spark can be prevented.

FIG. 4C shows the waveforms outputted from the NDFG 200 when the microcomputer 350 turns off the transistors TR during the predetermined period SDW from the predetermined time of the brush-off period to the predetermined time of the brush-on period. Here, the period SDW is indicated by hatching.

As described above, in the NDFG spark prevention apparatus according to the present invention, the voltage pulse controlling parts 201, 203, 205, and 207 are formed between the respective electrical connections of the DC power source of the NDFG, i.e., the brushes 201-204. The voltage pulse controlling parts 201,203,205, and 207 include the resistors R and the transistors TR which are connected in series with each other, and the transistors TR are synchronously operated with the rotation of the commutator 130. Accordingly, by controlling the electric current to flow through the transistors TR during the brush-off period, the spark, which is produced during the brush-off period, can be prevented.

Further, by controlling the transistors TR to be turned off from a predetermined time of the brush-off period to a predetermined time of the brush-on period, the electric current does not flow through the transistors TR at the beginning of the brush-on period, and the spark, which is produced at the beginning of the brush-on period, can be prevented.

Accordingly, while driving the NDFG 200 according to the present invention, by controlling the operational status of the transistors TR, particularly by controlling the conducting time of the transistors TR, the spark produced from the NdFG 200 can be prevented. As a result, the lifetime of the NDFG 200 is lengthened, while the stable operation thereof is guaranteed.

Further, in the NDFG spark prevention apparatus according to the present invention, the NDFG includes a corresponding pulse generating part including a photo-interrupter and a photo sensor. The photo interrupter includes a plurality of wings, and is fixed on the motor shaft of the NDFG to be synchronously rotated with the commutator. The photo sensor includes a light emitting part and a light receiving part. The light emitted from the light emitting part is cut-off or passed by the rotating photo-interrupter, and the optical pulse is selectively received in the light receiving part which generates pulse waveforms corresponding to the optical pulse. The photo-interrupter is synchronously rotated with the commutator, and accordingly, the light emitted from the light emitting part is cut-off or passed by the rotating photo-interrupter, and the light receiving part selectively receives the optical pulse. By operating the transistors based on the optical pulse signals, the transistors can be operated to precisely be synchronized with the rotation of the NDFG.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A non-directional frequency generator spark prevention apparatus comprising:

a non-directional frequency generator having a plurality of electric connections connected with a direct current power source, and a commutator for converting direct waveforms inputted through the electric connections into alternating current waveforms, and for outputting the alternating current waveforms; and a voltage pulse controlling part connected between the respective electric connections of the non-directional frequency generator, for controlling the alternating current waveforms outputted from the non-directional frequency generator by being controlled to have the conducting status of being synchronized with the rotation of the commutator of the non-directional frequency generator.

2. The apparatus as claimed in claim 1, wherein the voltage pulse controlling part comprises a resistor and a transistor which are connected with each other in series.

3. The apparatus as claimed in claim 1, wherein the transistor of the voltage pulse controlling part is controlled by the microcomputer in a manner that the operation time thereof is controlled.

4. The apparatus as claimed in claim 1, wherein the transistor of the voltage pulse controlling part is controlled to be in a conducting status during the brush-off period to prevent a spark production during the brush-off period.

5. The apparatus as claimed in claim 1, wherein the transistor of the voltage pulse controlling part is controlled to be in the non-conducting status during a predetermined period from a predetermined time of a brush-on period to a predetermined time of a brush-off period during which the electric current does not flow through the transistor to prevent a spark production at a beginning of the brush-on period.

6. The apparatus as claimed in claim 1, further comprising a corresponding pulse generating part for generating a predetermined pulse waveform corresponding to the rotation of the commutator of the non-directional frequency generator by being synchronously rotated with the commutator so as to permit the voltage pulse controlling part to synchronously enter into the conducting status corresponding to the rotation of the commutator.

7. The apparatus as claimed in claim 6, wherein the corresponding pulse generating part comprises:

a photo-interrupter having a plurality of wings, which is fixed on the motor shaft of the motor of the non-directional frequency generator to be synchronously rotated with the commutator, for generating a pulse waveform corresponding to the rotation of the commutator; and a photo sensor having a light emitting part and a light receiving part in which light from the light emitting part is cut-off or passed by the rotating photo-interrupter so that the light receiving part selectively receives optical pulses, the photo sensor for generating the pulse waveforms corresponding to the optical pulses.

8. The apparatus as claimed in claim 6, wherein the electric connections of the non-directional frequency generator comprise 2n (n=natural number) of input and output terminals for generating alternating current waveforms of (n) period, and the photo-interrupter of the corresponding pulse generating part comprises (n) of wings for generating pulse waveforms of (n) period which synchronize with the alternating current waveforms during one rotation of the commutator.

\* \* \* \* \*